US012214760B2

(12) United States Patent
Bruin et al.

(10) Patent No.: US 12,214,760 B2
(45) Date of Patent: Feb. 4, 2025

(54) REVERSE ACTUATED PNEUMATIC BRAKE

(71) Applicant: ZF CV SYSTEMS EUROPE BV, Brussels (BE)

(72) Inventors: James Bruin, Rochester Hills, MI (US); Michael Rizoiu, Oakville (CA)

(73) Assignee: ZF CV SYSTEMS EUROPE BV, Brussels (BE)

( * ) Notice: Subject to any disclaimer, the term of this patent is extended or adjusted under 35 U.S.C. 154(b) by 402 days.

(21) Appl. No.: 17/847,580

(22) Filed: Jun. 23, 2022

(65) Prior Publication Data

US 2023/0415720 A1 Dec. 28, 2023

(51) Int. Cl.
*B60T 13/38* (2006.01)
*B60T 13/68* (2006.01)
*B60T 15/02* (2006.01)

(52) U.S. Cl.
CPC ............ *B60T 13/38* (2013.01); *B60T 13/683* (2013.01); *B60T 15/027* (2013.01); *B60T 2270/10* (2013.01)

(58) Field of Classification Search
CPC ............................... B60T 13/38; B60T 15/027
See application file for complete search history.

(56) References Cited

U.S. PATENT DOCUMENTS

| 3,295,422 A | * | 1/1967 | Bostwick | B60T 17/085 |
| | | | | 188/170 |
| 4,726,628 A | * | 2/1988 | Vaughn | B60T 15/42 |
| | | | | 303/66 |
| 4,800,991 A | * | 1/1989 | Miller | F16D 66/025 |
| | | | | 116/285 |
| 2007/0028761 A1 | * | 2/2007 | Schrader | B60T 17/088 |
| | | | | 92/63 |
| 2016/0023645 A1 | * | 1/2016 | Wright | B60T 15/184 |
| | | | | 303/66 |

FOREIGN PATENT DOCUMENTS

| CN | 215370703 U | * | 12/2021 |
| SU | 1255483 A1 | * | 9/1986 |
| SU | 1735095 A1 | * | 5/1992 |

* cited by examiner

*Primary Examiner* — Melody M Burch
(74) *Attorney, Agent, or Firm* — Warner Norcross + Judd LLP

(57) ABSTRACT

A pneumatic brake for a vehicle is provided. The pneumatic brake includes a housing and a single diaphragm within the housing that divides the housing into front and rear variable-volume chambers. A push rod is disposed in the front chamber and extends outwardly from the housing. A parking spring is disposed in the rear chamber and urges the diaphragm and push rod towards the front chamber. A valve body extends through the rear chamber and includes an elongated stem disposed in a telescoping relationship with the push rod. In resting and activation modes, brake pressure is applied by the parking spring to the top plate to activate a brake function. In a deactivation mode, pneumatic pressure is supplied to the front chamber to compress the parking spring and disengage the brake. A brake system including the pneumatic brake and an ABS is also provided.

17 Claims, 12 Drawing Sheets

REVERSE ACTUATED PNEUMATIC BRAKE

FIELD OF THE INVENTION

The disclosure generally relates to pneumatic braking systems and, more specifically, to actuation of brake chambers of pneumatic brake systems.

BACKGROUND OF THE INVENTION

Traditional pneumatic spring brake chambers require pneumatic pressure from a reservoir tank to a service side of the chamber to actuate the brake chamber, causing slow and abrupt brake application. The chamber is also required to have a long length in order to house both a service and a parking portion of the chamber, and multiple diaphragms within the chamber to define the service portion and the parking portion. Additionally, these conventional arrangements require constant pneumatic pressure from a safety line to compress the parking spring, and parking spring energy is only utilized for loss of pneumatics during driving or when the vehicle is parked. Further, venting of the chamber to atmosphere is accomplished through open holes in the chamber, allowing for water ingress into the chamber, which contributes to corrosion. Furthermore, clocking of the chamber is required to align pneumatic ports in the chamber.

BRIEF SUMMARY

An improved pneumatic brake for a vehicle is provided. The improved pneumatic brake has a shorter housing length than in conventional systems, and only requires a single internal diaphragm. In contrast to conventional systems, pneumatic pressure holds back the parking spring until brake application when air in the front portion of the housing is transferred to the rear portion of the housing, allowing both the parking spring and the transferred air (as well as air that is delivered from an air tank reservoir to a rear portion of the housing) to apply the brake, thereby reducing energy loss, increasing brake application speed, and increasing the available braking force. Further, pneumatic ports may be located at the rear of the housing inside a swivel fitting that eliminates the need for chamber clocking. Furthermore, there are no atmospheric venting holes, and all the pneumatics are closed loop within the housing with any venting to atmosphere being provided through an anti-lock brake system (ABS).

More particularly, the pneumatic brake has a brake function and includes a cylindrical housing having a central, axially extending longitudinal axis. The pneumatic brake serves a dual function of both a parking brake and a service brake, such that the brake function is either or both of a service brake function and a parking brake function. A single diaphragm is disposed within the housing. The diaphragm divides the housing into front and rear variable-volume chambers. A push rod is axially disposed along the central axis of the housing. The push rod has a proximate end and an opposite distal end. The proximate end is disposed in the front chamber and terminates in a top plate that is engaged with the diaphragm. The distal end extends outwardly from the housing. A parking spring is axially disposed in the rear chamber along the central axis of the housing. The parking spring urges the diaphragm against the top plate in a direction towards the front chamber. A valve body extends axially through the rear chamber along the central axis of the housing. The valve body includes an elongated stem coaxially aligned with the push rod. The stem extends into an opening in the top plate and is disposed in a telescoping relationship with the push rod. A first supply passage is in fluid communication with a valve port in the valve body. The valve body includes a passageway through the stem in fluid communication with the valve port. The valve body further includes a plurality of open and closeable transfer ports in fluid communication with the rear chamber. The push rod includes an internal chamber in fluid communication with the passageway in the valve body. The push rod further includes a plurality of front chamber ports. The internal chamber of the push rod is in fluid communication with the front chamber via the plurality of front chamber ports. A second supply passage is in fluid communication with the rear chamber via a plurality of rear chamber ports. In a resting mode with no pneumatic pressure in the front and rear chambers, brake pressure is applied by the parking spring to the top plate. In a deactivation mode, pneumatic pressure is supplied to the front chamber to compress the parking spring and disengage the brake. In an activation mode, pneumatic pressure is transferred from the front chamber to the rear chamber, and pneumatic pressure is also supplied to the rear chamber via the second supply passage, to apply the brake function with both the pneumatic pressure and a spring force of the parking spring acting on the top plate.

In specific embodiments, the pneumatic brake further includes an internal transfer valve disposed in the valve body. The internal transfer valve is movable within the valve body.

In particular embodiments, the internal transfer valve has a generally tubular sidewall defining an internal passageway, a nose capping one end of the tubular sidewall, and an opposite open end.

In certain embodiments, the internal transfer valve includes a plurality of supply ports in the sidewall adjacent the nose. The supply ports are in fluid communication with the passageway in the valve body.

In certain embodiments, the nose of the internal transfer valve is receivable in the valve port in the valve body to close the valve port.

In certain embodiments, the sidewall of the internal transfer valve includes a stepped portion, and the valve body includes an internal shoulder that defines a stop for the stepped portion of the internal transfer valve.

In certain embodiments, the pneumatic brake further includes a valve spring disposed within the internal passageway of the internal transfer valve. The stepped portion of the sidewall defines a spring seat, and the valve spring is in urged engagement with the spring seat and the internal shoulder of the valve body.

In particular embodiments, sliding movement of the internal transfer valve in the valve body opens and closes the transfer ports.

In particular embodiments, the valve body includes a plurality of balance ports in fluid communication with the rear chamber, the sidewall of the internal transfer valve includes a stepped portion, and the internal transfer valve further includes an annular protrusion extending outwardly from the sidewall. The stepped portion and the annular protrusion contact an inner surface of the valve body A balance chamber is defined by the stepped portion, the annular protrusion, the sidewall of the internal transfer valve between the stepped portion and the annular protrusion, and the inner surface of the valve body. The balance chamber is in fluid communication with the rear chamber via the balance ports.

In specific embodiments, the valve body is continuous with the first supply passage, the first supply passage is coaxially disposed within the second supply passage, and a portion of the second supply passage surrounds the first supply passage.

In specific embodiments, the second supply passage is defined in part by a swivel fitting that is fitted within an opening in the rear chamber of the housing.

In specific embodiments, the spring force of the parking spring is equivalent to a pneumatic pressure in the range of 50 to 70 psi.

In specific embodiments, the pneumatic brake further includes a two-position spool valve in fluid communication with the first supply passage and the second supply passage.

In particular embodiments, the spool valve is a 4/2 proportional valve.

A brake system including the pneumatic brake connected to an anti-lock braking system (ABS) is also provided.

In specific embodiments, the first and second supply passages are connected through the ABS to a source of pneumatic pressure in the range of 110 to 130 psi.

In specific embodiments, the first and second supply passages are vented to atmosphere through the ABS.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 2:
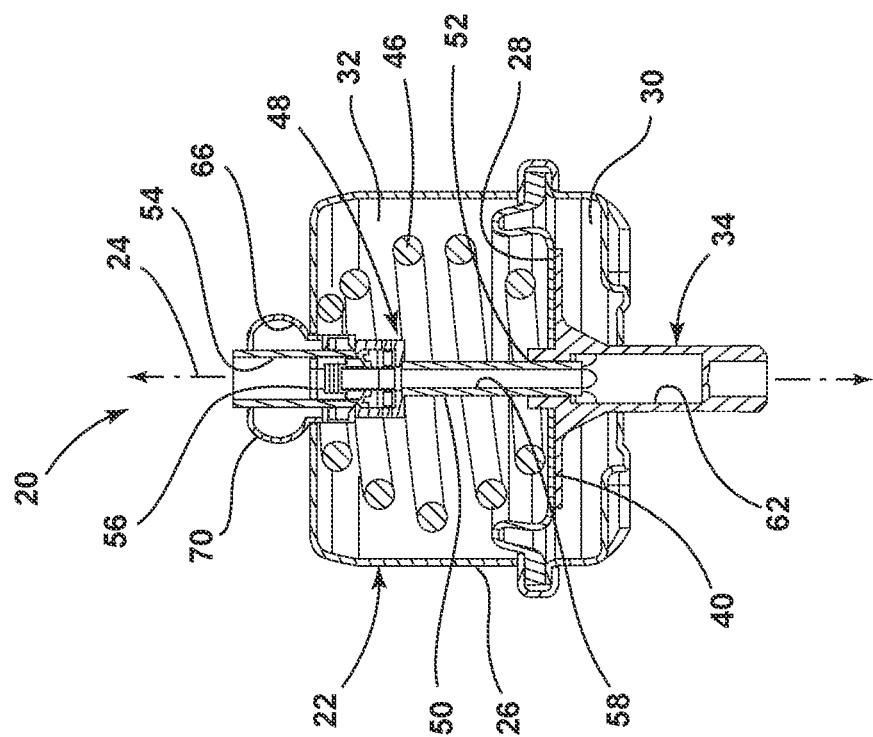
FIG. 2 is a cross-sectional view of the pneumatic brake of FIG. 1 taken along the line 2-2.
Figure 1:
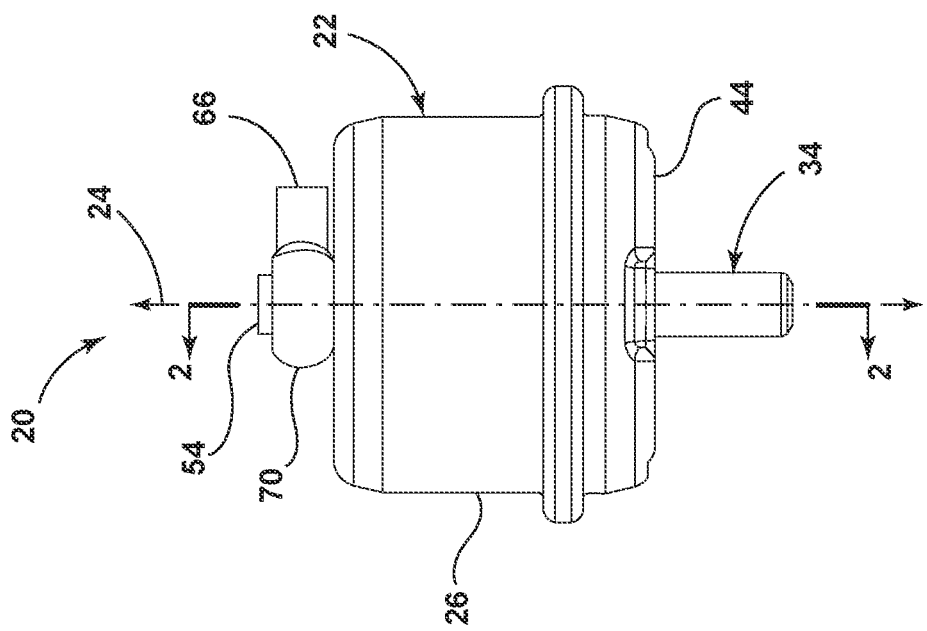
FIG. 1 is a plan view of a pneumatic brake in accordance with some embodiments of the disclosure.
Figure 3:
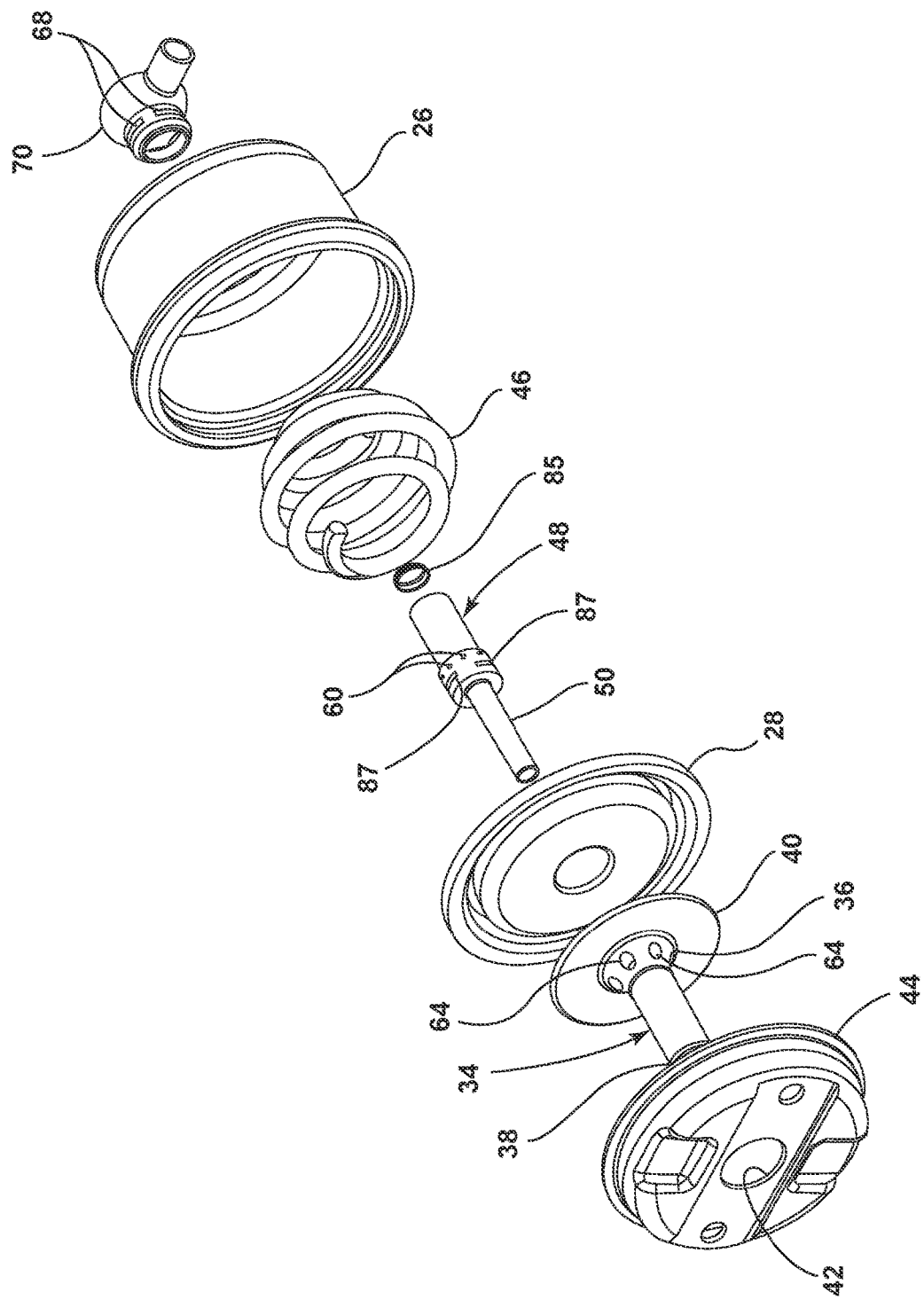
FIG. 3 is an exploded view of the pneumatic brake of FIG. 1.

A pneumatic brake assembly for a vehicle is provided. Referring to FIGS. 1-12, wherein like numerals indicate corresponding parts throughout the several views, the pneumatic brake is illustrated and generally designated at 20. Certain features of the pneumatic brake 20 are functional, but can be implemented in different aesthetic configurations.

Turning first to FIGS. 1-6, the pneumatic brake 20 includes a generally cylindrical housing 22 having a central, axially extending longitudinal axis 24 that runs along and passes through the center of the housing. The housing 22 is formed of an outer wall 26 that generally encloses the housing and defines an internal space inside of the housing. A single diaphragm 28 is disposed within the housing 22 and divides the internal space of the housing into two separate variable-volume chambers, namely a front chamber 30 and a rear chamber 32. When mounted in a vehicle, the front chamber 30 is proximate the wheel brake (e.g. drum brake arrangement or disc brake arrangement) and the rear chamber 32, being rearward of the front chamber, is spaced from the wheel brake. A push rod 34 having a proximate end 36 and an opposite distal end 38 is axially disposed along the central longitudinal axis 24 of the housing 22. The proximate end 36 of the push rod 34 is disposed in the front chamber 30 of the housing 22 and terminates in a top plate 40 that is engaged with a surface of the diaphragm 28. The distal end 38 of the push rod 34 extends outwardly from the housing 22 through a sealed opening 42 in a cover 44 of the housing 22. In operation, the push rod 34 may engage slack adjusters (not shown) of a vehicle wheel brake such as a drum brake arrangement in order to engage and release the vehicle wheel brake.

A parking spring 46 is axially disposed in the rear chamber 32 of the housing 22 along the central longitudinal axis 24, such that a central longitudinal axis of the parking spring is collinear and aligned with the central longitudinal axis 24 of the housing. The parking spring 46 engages a surface of the diaphragm 28 opposite the top plate 40 and urges the diaphragm against the top plate in a direction towards the front chamber 30. A valve body 48 extends axially through the rear chamber 32 of the housing 22 along the central longitudinal axis 24 of the housing. The valve body 48 is also coaxial with the parking spring 46 and the push rod 34. Particularly, the valve body 48 includes an elongated stem 50 coaxially aligned with the push rod 34. The stem 50 extends into the push rod 34 through an opening 52 in the top plate 40 and is disposed in a telescoping relationship with the push rod such that the push rod slides over the stem as the push rod is extended and retracted.

A first supply passage 54 is in fluid communication with a valve port 56 in the valve body 48. The first supply passage 54 is defined by a generally cylindrical end of the valve body that is continuous with the valve body and extends outwardly from the rear of the housing 22 opposite the opening 52 in the cover 44 of the housing. The valve body 48 includes a passageway 58 through the stem 50 in fluid communication with the valve port 56, and the valve body also includes a plurality of open and closeable transfer ports 60 in fluid communication with the rear chamber 32 of the housing 22. The push rod 34 includes an internal chamber 62 in fluid communication with the passageway 58 in the valve body 48. The push rod 34 also includes a plurality of front chamber ports 64. The internal chamber 62 of the push rod 34 is in fluid communication with the front chamber 30 of the housing 22 via the plurality of front chamber ports 64. A second supply passage 66 is in fluid communication with the rear chamber 32 via a plurality of rear chamber ports 68. The second supply passage 66 is defined at least in part by a swivel fitting (banjo port) 70 that is fitted within a central opening 72 in the rear chamber 32 of the housing 22. The swivel fitting 70 has a generally doughnut shaped main portion from which extends a coaxial portion that includes the rear chamber ports 68 and which extends into the central opening 72. The swivel fitting 70 also includes a transverse portion that extends tangentially from the side of the doughnut shaped main portion. The valve body 48 is coaxial with the swivel fitting 70 such that the first supply passage 54 is disposed within the second supply passage 66 and extends through the doughnut shaped main portion of the swivel fitting, The doughnut shaped main portion and the coaxial portion of the swivel fitting 70 thereby surround the first supply passage 54. As described in more detail below, the first supply passage 54 can receive compressed air from a compressed air source such as an air reservoir to deliver the compressed air to the front chamber 30 of the housing 22 through the valve body 48 and the push rod 34, and also provides a reverse path for exhaust of compressed air from the front chamber of the housing. Similarly, the second supply passage 66 can receive compressed air from the compressed air source to deliver the compressed air to the rear chamber 32 of the housing 22, and also provides a reverse path for exhaust of compressed air from the rear chamber of the housing.

An internal transfer valve 74 is disposed in the valve body 48 and is movable in a sliding manner within the valve body. Sliding movement of the internal transfer valve 74 inside of the valve body 48 opens and closes the transfer ports 60. The internal transfer valve 74 has a generally tubular sidewall 76 defining an internal passageway. A nose 78 caps one end of the tubular sidewall 76, and the opposite end 80 of the sidewall is open. The nose 78 of the internal transfer valve 74 is receivable in the valve port 56 in the valve body 48 to close the valve port, and an annular flange 81 extending into the passageway 58 (and in which the valve port 56 is formed) defines a valve seat for the internal transfer valve. The internal transfer valve 74 includes a plurality of supply ports 82 in the sidewall 76 adjacent the nose 78. The supply ports 82 are in fluid communication with the passageway 58 in the valve body 48 on either side of the internal transfer valve 74. The sidewall 76 of the internal transfer valve 74 includes a stepped portion 83, and the valve body 48 includes an internal shoulder 84 that defines a stop for the stepped portion of the internal transfer valve. A valve spring 85 is disposed within the internal passageway defined by the tubular sidewall 76 of the internal transfer valve 74. The stepped portion 83 of the sidewall 76 defines a spring seat 86, and the valve spring 85 is in urged engagement with the spring seat and the internal shoulder 84 of the valve body 48.

The valve body 48 further includes a plurality of balance ports 87 in fluid communication with the rear chamber 32 of the housing 22. A balance chamber 88 is in fluid communication with the rear chamber 32 via the balance ports 87 in the valve body 48. The balance chamber 88 is defined by the stepped portion 83 in the sidewall 76 of the internal transfer valve 74, an annular protrusion 89 extending outwardly from the sidewall of the internal transfer valve, a portion of the sidewall between the stepped portion and the annular protrusion, and an inner surface 90 of the valve body 48. The stepped portion 83 in the sidewall 76 and the annular protrusion 89 contact the inner surface 90 of the valve body to seal the balance chamber 88 disposed within the valve body 48.

Figure 5:
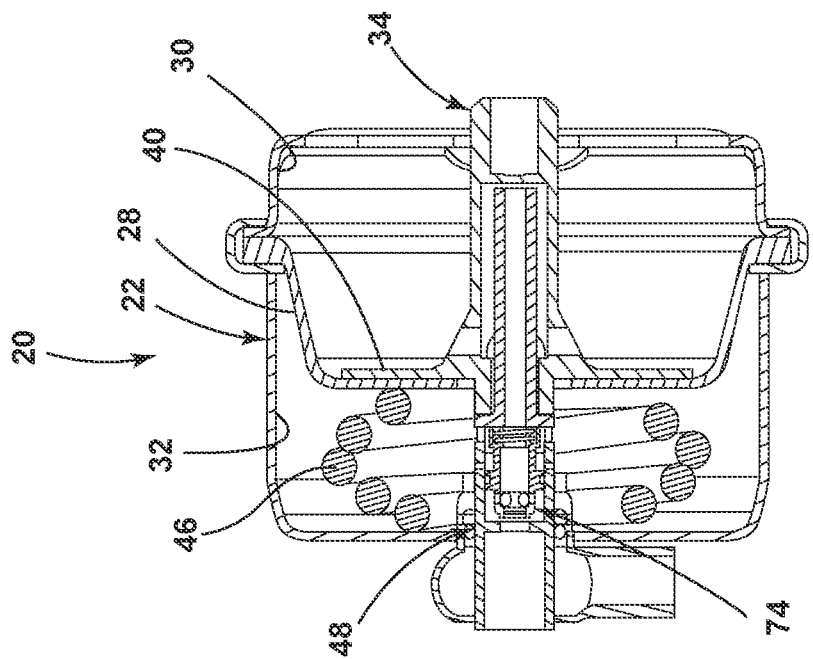
FIG. 5 is a sectional view of the pneumatic brake of FIG. 1 illustrating a fully retracted disposition of the pneumatic brake.
Figure 4:
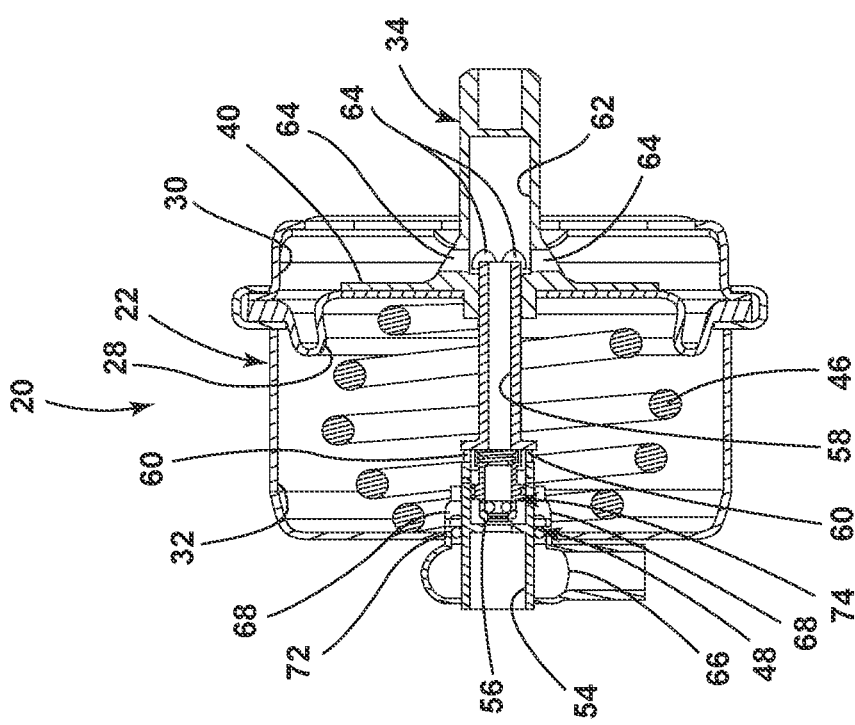
FIG. 4 is a sectional view of the pneumatic brake of FIG. 1 illustrating a fully extended disposition of the pneumatic brake.

With reference now particularly to FIGS. 4-12, the pneumatic brake 20 may be operated in a resting mode, an activation mode in which a brake function is actuated, and a deactivation mode in which the brake function is deactivated. The positional states of the diaphragm 28, the push rod 34 including top plate 40, and the parking spring 46 when the brake function is actuated are shown in FIG. 4, and their positional states when the brake function is deactivated are shown in FIG. 5. As shown in FIG. 4, in the resting mode no compressed air is present in either the front chamber 30 or the rear chamber 32 of the housing 22, such that the spring force of the parking spring 46 against the diaphragm 28 and top plate 40 fully extends the push rod 34 out of the housing, thereby applying the vehicle brake (not shown). For example, both the front and rear chambers 30, 32 may be vented to atmosphere via the first and second supply passages 54, 66, respectively. The spring force is approximately equivalent to about 50 to 70 psi of pneumatic pressure, preferably about 60 psi, which is adequate to hold the push rod 34 in its extended position. The brake 20 is operated in the resting mode, for example, when the vehicle is shut off and thus no compressed air is being produced by the vehicle for delivery to the brake 20. Hence, the default state of the brake 20, when the vehicle is parked and not operational, is for the brake to apply the vehicle brakes to hold the vehicle in a static (parked) position. The spring force of the parking spring 46 may also provide braking pressure to the top plate and push rod in an emergency mode, such as when a loss of the supply of compressed air (loss of pneumatic pressure) to the brake 20 occurs.

Figure 6:
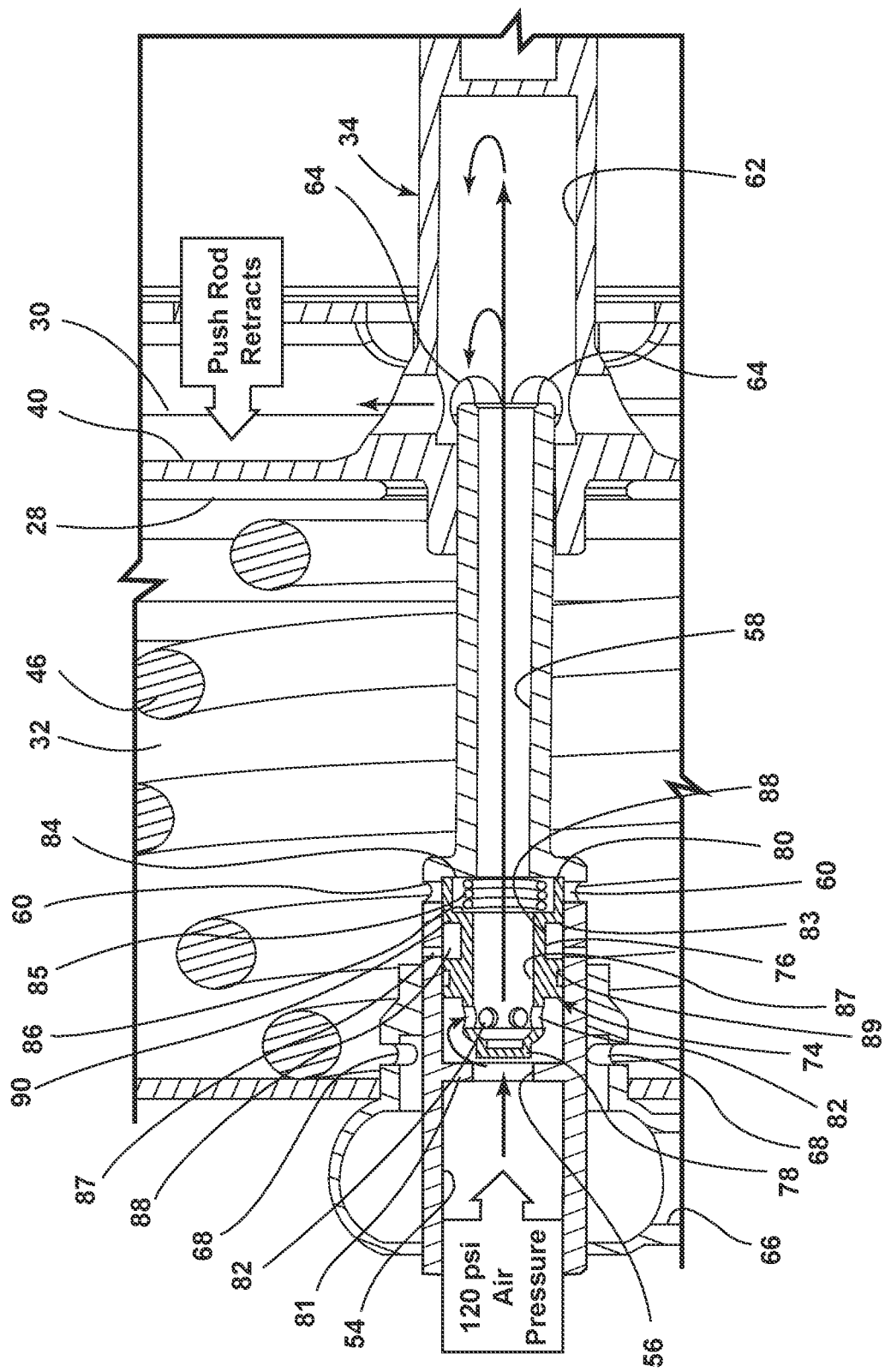
FIG. 6 is a partial sectional view of the pneumatic brake of FIG. 1 illustrating air flow movement for releasing the brake from a resting disposition (no pneumatic pressure)
Figure 7:
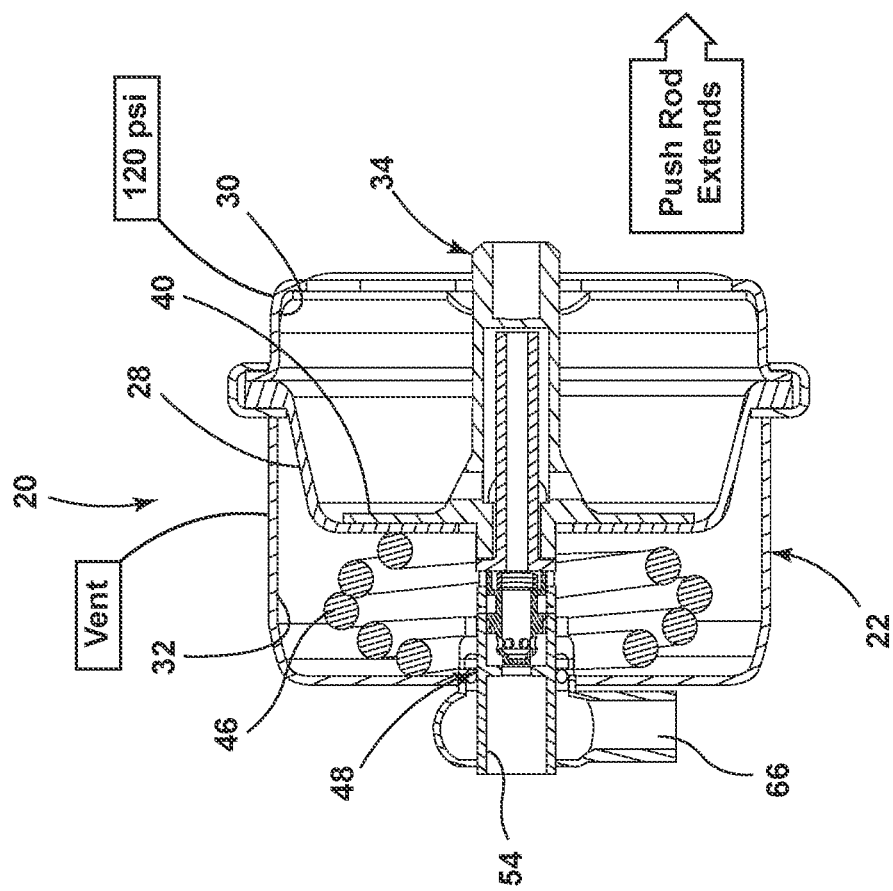
FIG. 7 is a partial sectional view of the pneumatic brake of FIG. 1 illustrating the disposition of the pneumatic brake when the brake is released.

Turning to FIG. 6, to deactivate the brake function and to enter the deactivation mode, compressed air at a pressure in the range of 110 to 130 psi, preferably about 120 psi, is supplied to the pneumatic brake 20 from a compressed air supply such as an air reservoir located on the vehicle (not shown) through the first supply passage 54. The force of the compressed air in the first supply passage 54 pushes against the nose 78 of the internal transfer valve 74 and compresses the valve spring 85, thereby opening the internal transfer valve and allowing the compressed air to travel into the valve body 48. The compressed air is communicated through the supply ports 82 into the passageway 58 through the stem 50 of the valve body 48. The compressed air passes from the passageway 58 into the internal chamber 62 of the push rod 34 and is communicated into the front chamber 30 through the front chamber ports 64 in the push rod. The compressed air in the front chamber 30 exerts pressure against the top plate 40, and the force of the compressed air overcomes the spring force of the parking spring 46, thereby moving the diaphragm 28 in the direction of the rear chamber 32, retracting the push rod 34, compressing parking spring 46, increasing the volume of the front chamber and simultaneously decreasing the volume of the rear chamber. At the same time, the rear chamber 32 is vented through the second supply passage 66 so that the rear chamber is generally at or near atmospheric pressure. Further, if, for example, the deactivation mode is selected when the brake is in the resting mode described above, the rear chamber would already be in a state in which it is vented and generally at atmospheric pressure. Once in the deactivated state of the deactivation mode as shown in FIG. 7, the front chamber is pressurized at approximately 120 psi thereby counteracting the spring force of the parking spring 46. Also, the push rod 34 is fully retracted into the housing 22, and the vehicle wheel brake (not shown) is released to disengage the brake function. The vehicle is now in a state in which it may be moved from a static (parked) position.

Figure 8:
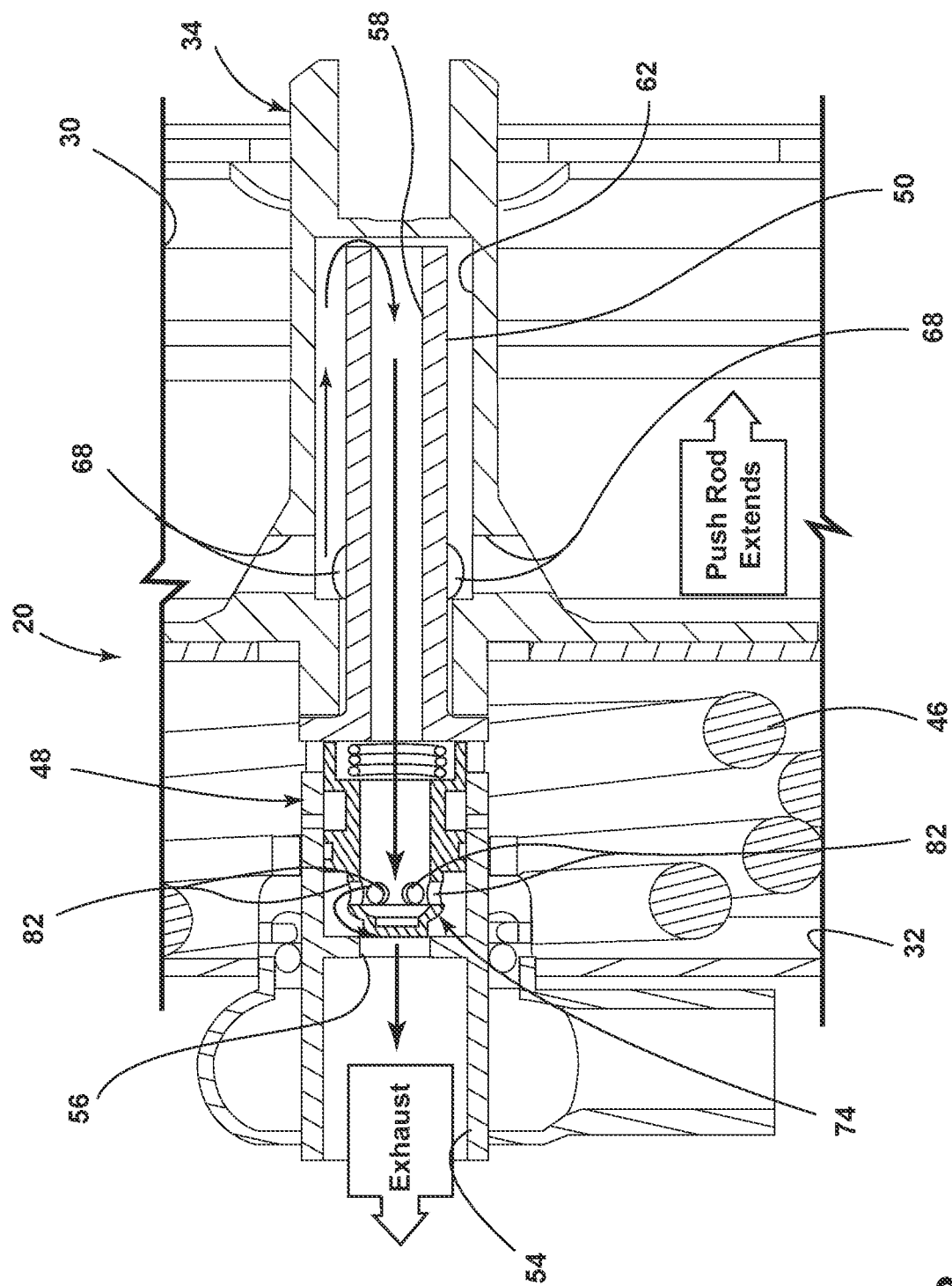
FIG. 8 is a partial sectional view of the pneumatic brake of FIG. 1 illustrating air flow movement to begin to apply the brake from the fully retracted disposition.
Figure 9:
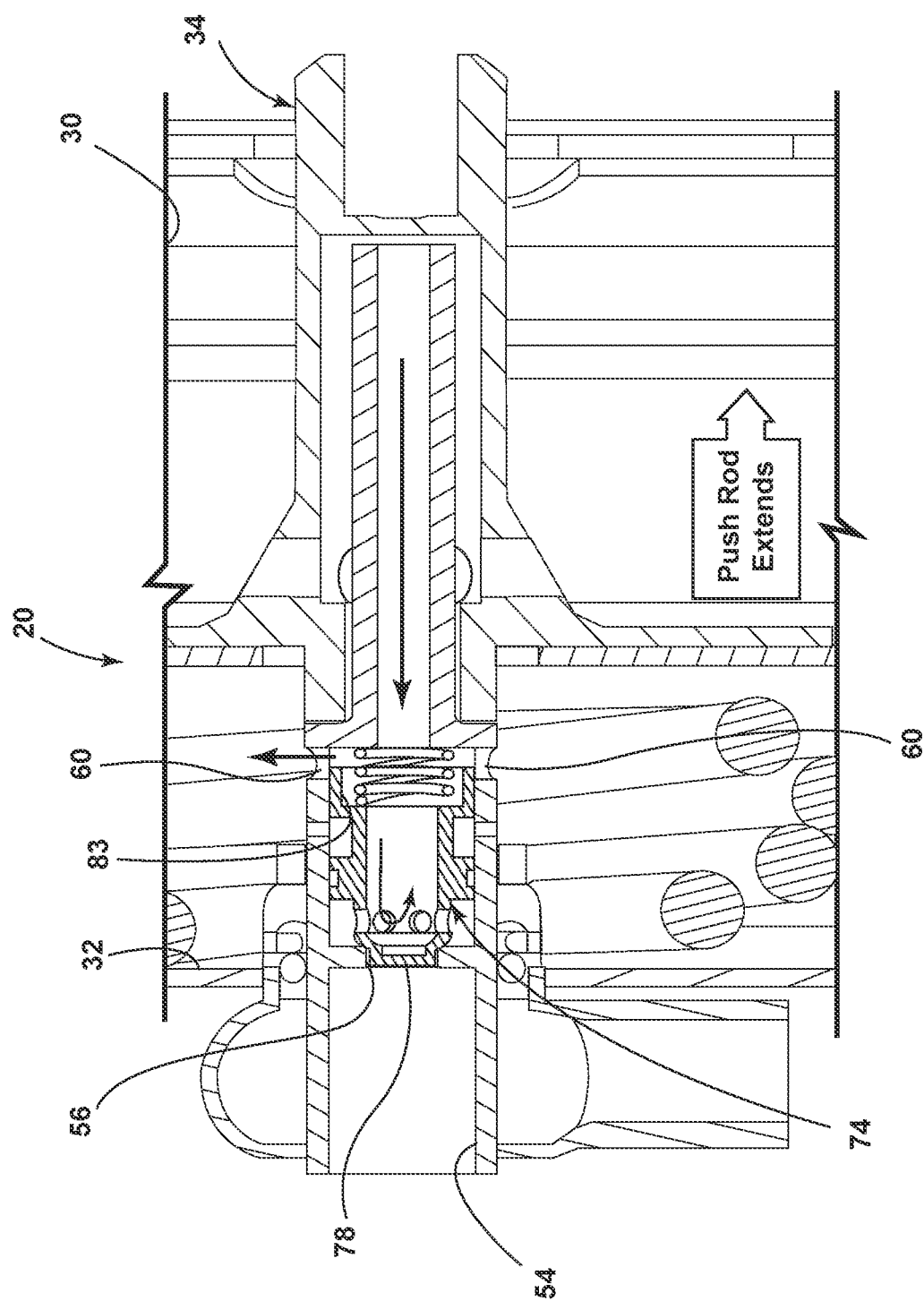
FIG. 9 is a partial sectional view of the pneumatic brake of FIG. 1 illustrating further air flow movement during transition from the fully retracted position (brake released) to the fully extended disposition (brake applied)
Figure 10:
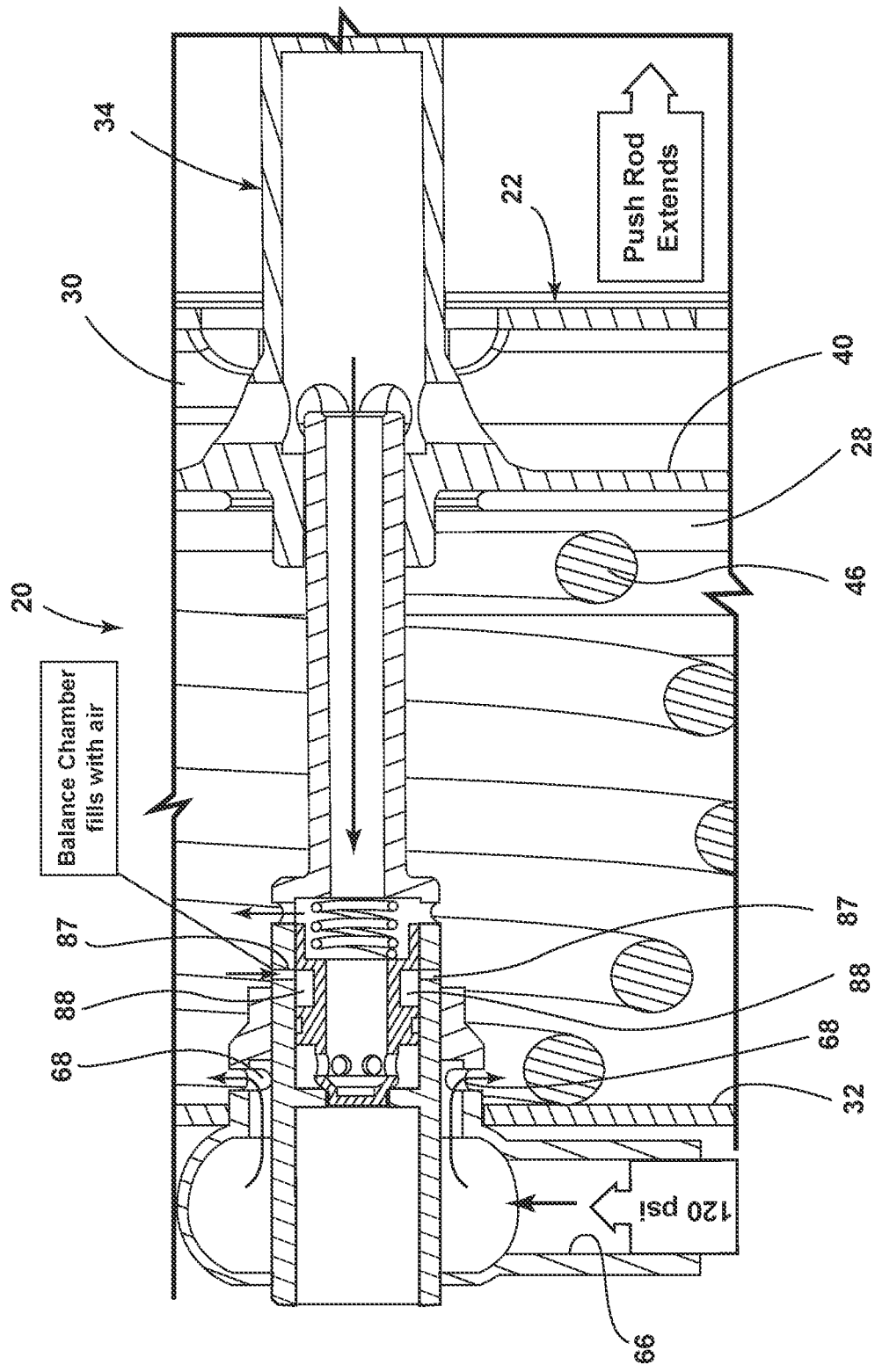
FIG. 10 is a partial sectional view of the pneumatic brake of FIG. 1 illustrating further air flow movement during the transition from the fully retracted position to the fully extended position.
Figure 11:
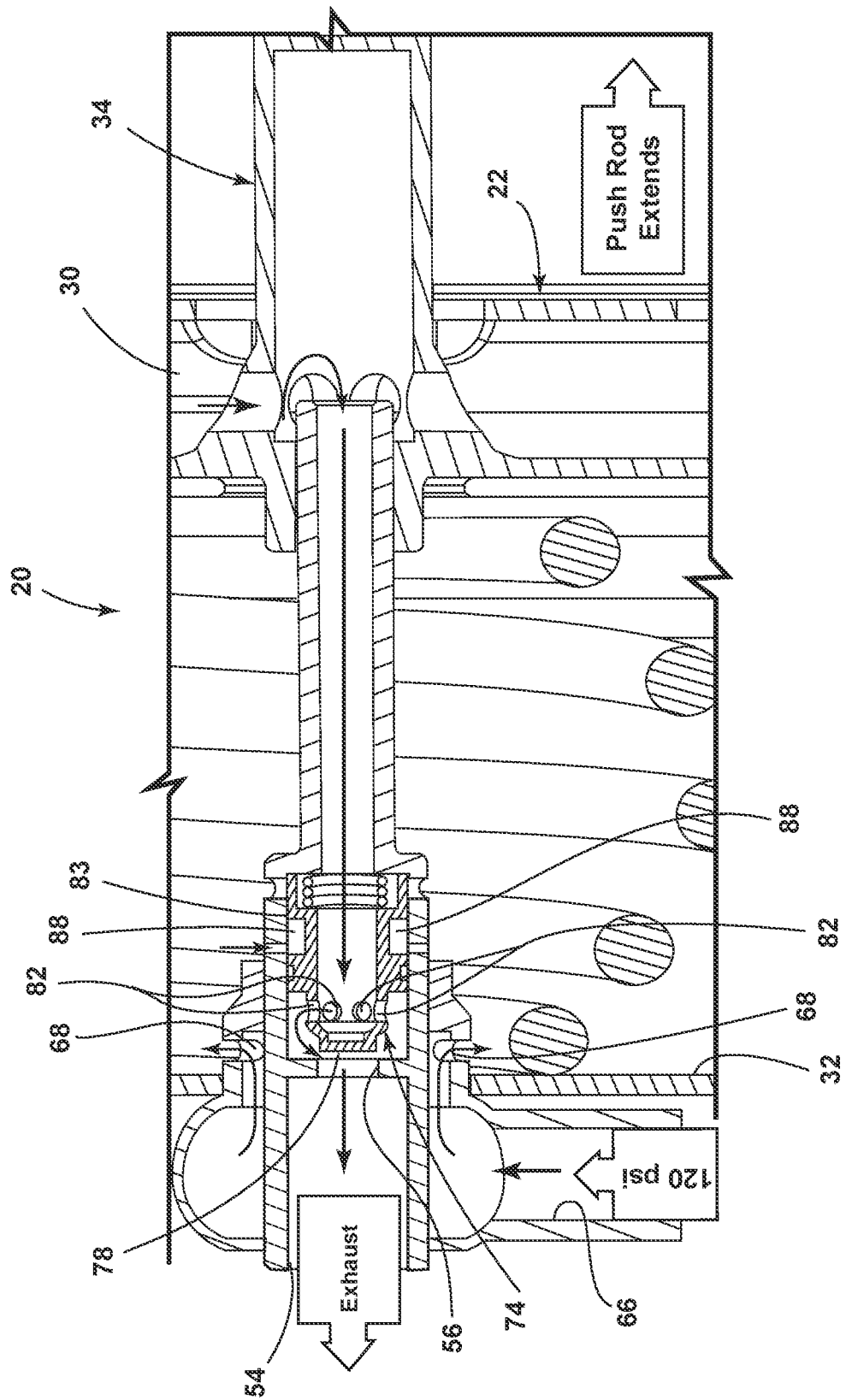
FIG. 11 is a partial sectional view of the pneumatic brake of FIG. 1 illustrating further air flow movement as the pneumatic brake approaches the fully extended disposition in which a brake function is actuated.

Turning to FIG. 8, to transition from the deactivation mode to the activation mode in which the brake function is actuated, the supply of compressed air to the front chamber 30 is ceased, and the first supply passage 54 is connected to an atmospheric vent to allow for the exhaust of compressed air through the first supply passage. Particularly, the compressed air in the front chamber 30 travels through the rear chamber ports 68 into the internal chamber 62 of the push rod 34, from the internal chamber into the passageway 58 in the stem 50 of the valve body 48, through the supply ports 82 of the internal transfer valve 74, out of the valve port 56 of the valve body, and into the first supply passage 54. The exhaust of compressed air from the front chamber 30 causes the push rod 34 to begin to extend, due to the spring force exerted by the parking spring 46. As shown in FIG. 9, during the transition from the deactivation mode to the activation mode, the return force of the valve spring 85 slideably moves the internal transfer valve 74 from an open position to a closed position in which the nose 78 of the valve is seated in the valve port 56, thereby preventing further exhaust of air through the first supply passage 54. The movement of the internal transfer valve 74 moves the stepped portion 83 of the valve from a position in which it covers the transfer ports 60 to a position in which the transfer ports are open. Once the transfer ports 60 are open, compressed air from the front chamber 30 is transferred to the rear chamber 32 through the transfer ports. The internal transfer valve 74 thereby provides a path for the compressed air to travel from the front chamber 30 to the rear chamber 32 to assist with the brake application force requirements. Simultaneously, as shown in FIG. 10, compressed air from the source of pressurized air (air reservoir) is supplied to the rear chamber 32 through the second supply passage 66 and the rear chamber ports 68. Also, compressed air in the rear chamber 32 travels through the balance ports 87 into the balance chamber 88. The combined action of the compressed air supplied to the rear chamber 32 via the second supply passage 66 as well as from the front chamber 30 (as shown in FIG. 9) quickens the speed at which the pneumatic brake 20 moves from the deactivation mode to the activation mode. As there is a delay in the supply of compressed air to the rear chamber 32 from the second supply passage 66, the internal transfer valve 74 provides a shorter path for air to travel into the rear chamber hence increasing the speed of brake application. Additionally, the combined force of the compressed air in the rear chamber 32 and the force exerted by the parking spring 46 quicken the speed at which the diaphragm 28 moves the top plate in the direction of the front chamber 30, thereby extending the push rod 34 out of the housing 22. Turning to FIG. 11, when the pressure in the balance chamber 88 exceeds the return spring force of the valve spring 85, the pressure in the balance chamber is exerted against the stepped portion 83 of the internal transfer valve 74, thereby compressing the valve spring and moving the internal transfer valve from a closed to an open position in which the nose 78 is unseated from the valve port 56. The remaining compressed air in the front chamber 30 then is exhausted through the first supply passage 54 via the supply ports 82 in the internal transfer valve 74, and the front chamber remains vented. Compressed air continues to be supplied to the rear chamber 32 through the second supply passage 66 and rear chamber ports 68, and the push rod 34 is fully extended to actuate the brake function in which the push rod causes the wheel brakes of the vehicle to be engaged. Thus, in the activation mode the combination of air (pneumatic pressure) being transferred from the front chamber 30 to the rear chamber 32 (i.e. removed from the front chamber 30 and sent to the rear chamber 32 via the internal transfer valve 74) as well as the secondary pneumatic force provided by the additional, secondary supply of compressed air (pneumatic pressure) to the rear chamber 32 from the air reservoir through the second supply passage 66 ensures that full braking pressure/force is available and achieved.

Figure 12:
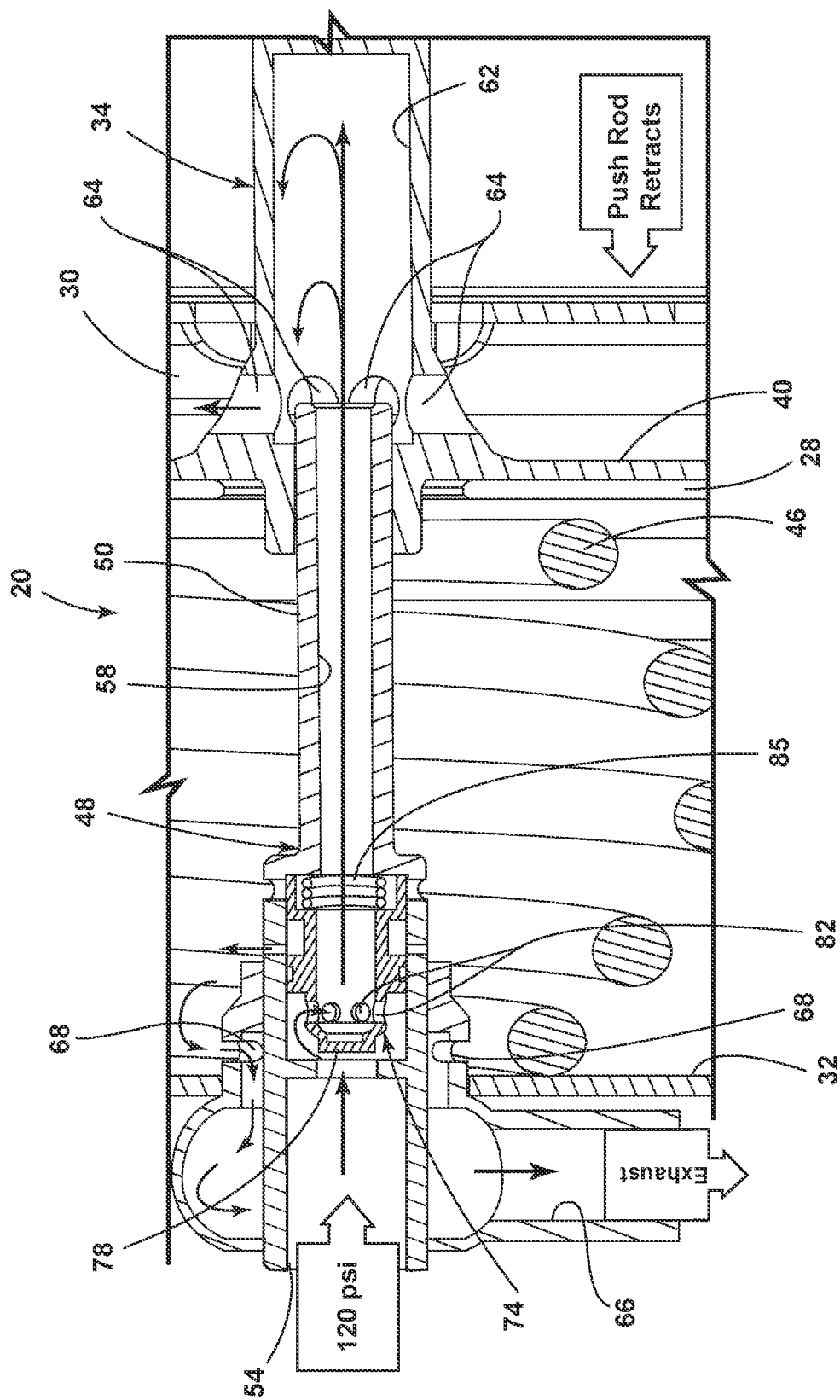
FIG. 12 is a partial sectional view of the pneumatic brake of FIG. 1 illustrating air flow movement for releasing the brake from an active brake function in which pressurized air is applied to the pneumatic brake.

Turning to FIG. 12, to transition from the activation mode to the deactivation mode in which the brake function is deactivated and the wheel brakes are released, the supply of compressed air through the second supply passage 66 is stopped, and compressed air is released from the rear chamber 32 through the second supply passage via the rear chamber ports 68 by venting the second supply passage to atmosphere. At the same time, compressed air is supplied to the pneumatic brake 20 from the compressed air supply through the first supply passage 54. The force of the compressed air in the first supply passage 54 pushes against the nose 78 of the internal transfer valve 74 and compresses the valve spring 85, thereby opening the internal transfer valve and allowing the compressed air to travel into the valve body 48. The compressed air is communicated through the supply ports 82 into the passageway 58 through the stem 50 of the valve body 48. The compressed air passes from the passageway 58 into the internal chamber 62 of the push rod 34 and is communicated into the front chamber 30 through the front chamber ports 64 in the push rod. The compressed air in the front chamber 30 exerts pressure against the top plate 40, and the force of the compressed air overcomes the spring force of the parking spring 46, thereby moving the diaphragm 28 in the direction of the rear chamber 32, retracting the push rod 34, compressing parking spring 46, increasing the volume of the front chamber and simultaneously decreasing the volume of the rear chamber. The pneumatic brake 20 is then in the deactivation mode as shown in FIG. 7.

Figure 14:
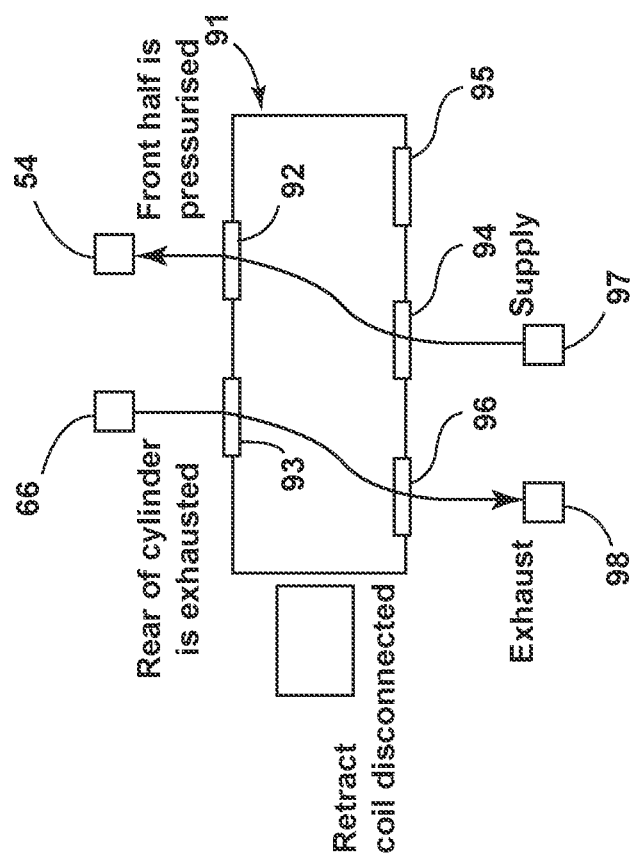
FIG. 14 is a schematic view of the anti-lock brake system (ABS) of the brake system including the pneumatic brake in a fully retracted disposition.
Figure 13:
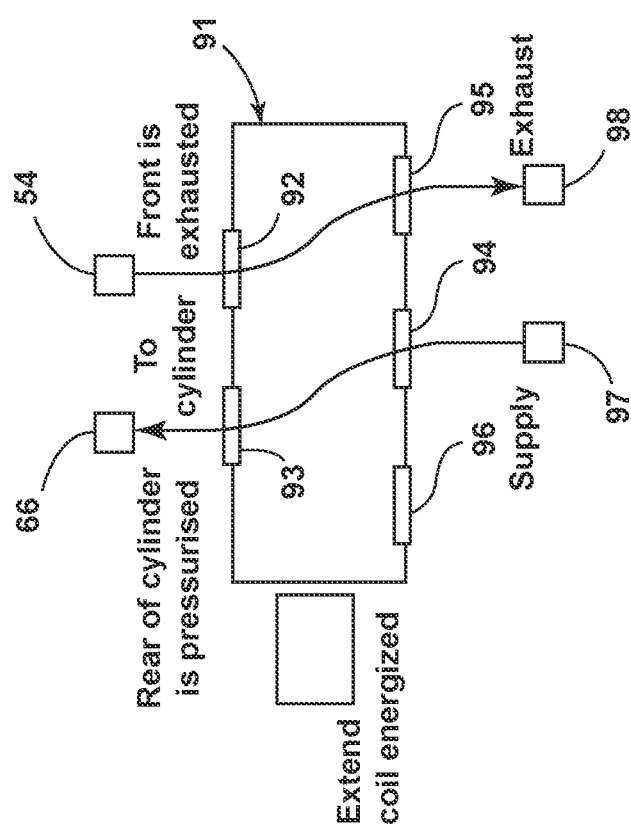
FIG. 13 is a schematic view of an anti-lock brake system (ABS) of a brake system in accordance with some embodiments of the disclosure, wherein the pneumatic brake is in a fully extended disposition.

With additional reference now to FIGS. 13-16, in some embodiments, one or more pneumatic brake 20 is included in a vehicle brake system, with each pneumatic brake being located at a wheel end of the vehicle, and each pneumatic brake being connected to an anti-lock braking system (ABS) that is a sub-system of the vehicle brake system. For example, as shown in FIGS. 13 and 14, in certain embodiments the ABS may be a 5 port, 2 position spool valve 91 that controls the extension and retraction of the push rod 34 of the pneumatic brake 20. One port 92 of the spool valve 91 is in fluid communication with the first supply passage 54 (which supplies air to and exhausts the front chamber 30), and another port 93 of the spool valve is in fluid communication with the second supply passage 66 (which supplies air to and exhausts the rear chamber 32). Further, one port 94 of the spool valve 91 is in fluid communication with a supply of compressed air (e.g., an air reservoir 97), and the other two ports 95, 96 of the spool valve are in fluid communication with an exhaust outlet (e.g., an atmospheric vent 98). In one position of the spool valve 91 shown schematically in FIG. 13, a coil of the spool valve is energized such that port 94 is in fluid communication with port 93 to supply compressed air from the air reservoir 97 to the second supply passage 66 and subsequently to the rear chamber 32 of the pneumatic brake 20. Also, port 95 is in fluid communication with port 92 to exhaust air from the front chamber 30 through the first supply passage 54 to the atmospheric vent 98. In this position, the push rod 34 of the pneumatic brake 20 is extended and the wheel brake in connection with the pneumatic brake is engaged. In the other position of the spool valve 91 shown schematically in FIG. 14, the coil of the spool valve is disconnected (i.e., not energized) such that port 94 is in fluid communication with port 92 to supply compressed air from the air reservoir 97 to the first supply passage 54 and subsequently to the front chamber 30 of the pneumatic brake 20. Also, port 96 is in fluid communication with port 93 to exhaust air from the rear chamber 32 through the second supply passage 66 to the atmospheric vent 98. In this position, the push rod 34 of the pneumatic brake 20 is retracted and the wheel brake in connection with the pneumatic brake is released (disengaged). Optionally, each spool valve 91 of the system (one per pneumatic brake 20) may be combined into one single ABS unit with a dual output pneumatic line routed to the wheel ends at which the pneumatic brakes are located. Also, the ABS may be electrically (e.g. EBS, brake by wire, etc.) or pneumatically (e.g., pilot signal) controlled. Further, each spool valve 91 may be positioned on top of the housing 22 of each pneumatic brake 20 included in the system, and a single pneumatic supply line and electrical wire may be routed to each wheel end, with the spool valves being electrically actuated (e.g. EBS, brake by wire, etc.).

The pneumatic brake 20 described above serves a dual function of both a parking brake and a service brake. Therefore, it should be understood from the description that the activation and deactivation of the brake function may be activation/deactivation of a service brake function for intermittent slowing down or stopping of a vehicle and/or a parking brake function for holding a vehicle in a static position for an indefinite amount of time without further attention.

Figure 15:
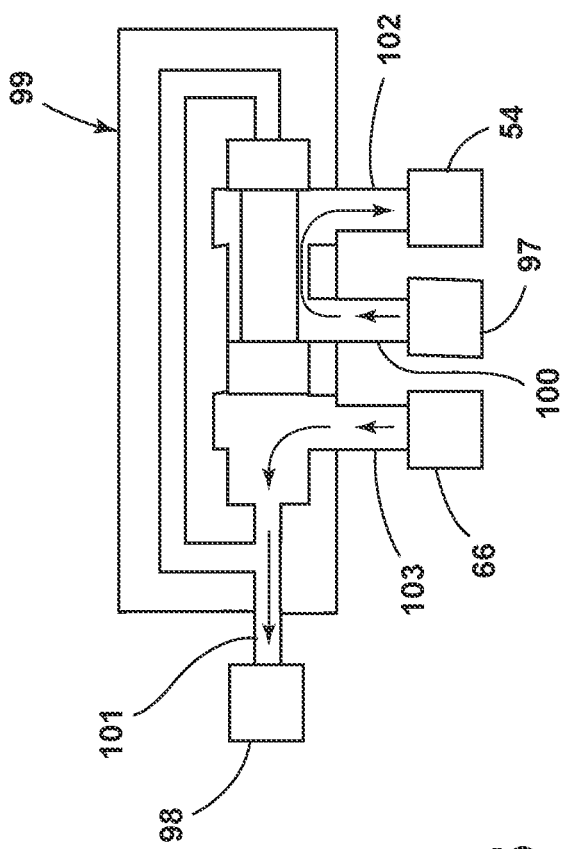
FIG. 15 is a sectional, schematic view of a 4/2 proportional valve of the brake system in accordance with some embodiments of the disclosure, wherein the valve is in a first disposition.
Figure 16:
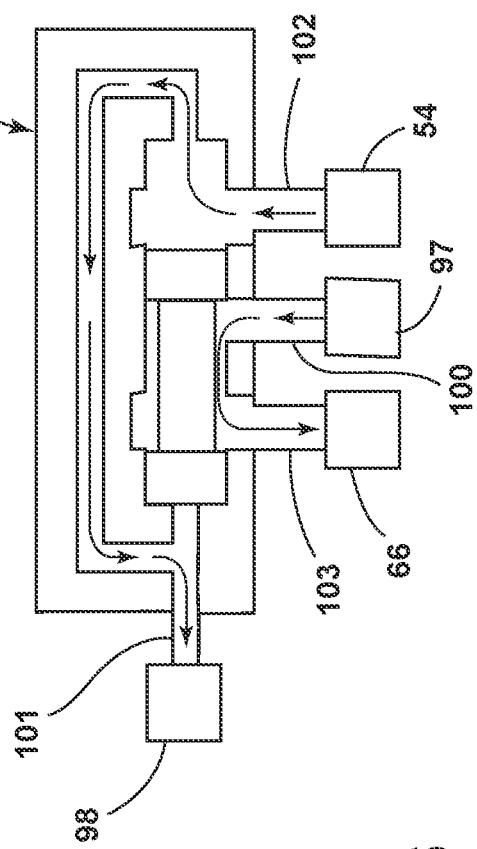
FIG. 16 is a sectional, schematic view of the 4/2 proportional valve of the brake system, wherein the valve is in a second disposition.

In certain embodiments shown in FIGS. 15 and 16, the brake function of the pneumatic brake 20 may controlled by a 4/2 proportional valve 99 that may be integrated into any ABS system as the proportional valve 99 works with a proportional voltage or current signal (depending on the controller) to adjust the spool valve between two ports. Since the proportional valve 99 effectively functions in the same way as ABS modulators, the proportional valve 99 is directly compatible with and able to be integrated into any ABS system. One port 100 of the valve 99 is in fluid communication with a source of pressurized air 97, one port 101 is in fluid communication with an atmospheric vent 98, one port 102 is in fluid communication with the first supply passage 54, and one port 103 is in fluid communication with the second supply passage 66. As shown by example in FIG. 15, in one position of the valve 99, pressurized air is fed from the source 97 to the first supply passage 54, while air from the second supply passage 66 is exhausted to the vent 98. Further, as shown by example in FIG. 16, in the other position of the valve 99, pressurized air is fed from the source 97 to the second supply passage 66, while air from the first supply passage 54 is exhausted to the vent 98. Proportional valves are rather fast and effective at precisely modulating flow and pressures. Alternatively, a servo valve may be used, which may have a faster and more precise reaction than the proportional valve 99. A servo valve includes an internal LVDT that tracks spool position for precise spool control. The internal circuitry of a servo valve monitors the spool position via the LVDT and compares it to the input signal. The internal PID loop of the servo valve reduces the spool positional error, making the control loop even faster.

In some embodiments of the brake system, additional feedback sensors may be incorporated into the valves and chambers. These sensors may be used by the ABS, and additionally by other systems such as traction control, ESP (dynamic stability), EBD (electronic brake force distribution), EDL (electronic differential lock), and brake fault diagnostic systems. The sensors may include a stroke position sensor that tracks usage and extension limits that can be used by telematics and monitoring, and that can identify brake faults such as slack adjuster failures, chamber failures, control valve failures, pressure/line failures, and other mechanical failures. The brake system may also include line pressure transducers that monitor chamber pressures, detect pressure system/line failures, and/or detect operational failures such as the compressor, valves in the supply line, and/or tank/reservoir performance.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A pneumatic brake for a vehicle, the pneumatic brake providing a brake function and comprising:
   a cylindrical housing having a central, axially extending longitudinal axis;
   a single diaphragm within the housing, the diaphragm dividing the housing into front and rear variable-volume chambers;
   a push rod axially disposed along the central axis of the housing, the push rod having a proximate end and an opposite distal end, the proximate end being disposed in the front chamber and terminating in a top plate that is engaged with the diaphragm, the distal end extending outwardly from the housing;
   a parking spring axially disposed in the rear chamber along the central axis of the housing, the parking spring urging the diaphragm against the top plate in a direction towards the front chamber;
   a valve body extending axially through the rear chamber along the central axis of the housing, the valve body including an elongated stem coaxially aligned with the push rod, the stem extending into an opening in the top plate and being disposed in a telescoping relationship with the push rod;
   a first supply passage in fluid communication with a valve port in the valve body;
   the valve body including a passageway through the stem in fluid communication with the valve port, and the valve body further including a plurality of open and closeable transfer ports in fluid communication with the rear chamber;
   the push rod including an internal chamber in fluid communication with the passageway in the valve body, the push rod further including a plurality of front chamber ports, the internal chamber of the push rod being in fluid communication with the front chamber via the plurality of front chamber ports; and
   a second supply passage in fluid communication with the rear chamber via a plurality of rear chamber ports;
   wherein in a resting mode with no pneumatic pressure in the front and rear chambers, brake pressure is applied by the parking spring to the top plate, in a deactivation mode pneumatic pressure is supplied to the front chamber to compress the parking spring and disengage the brake, and in an activation mode pneumatic pressure is transferred from the front chamber to the rear chamber, and pneumatic pressure is also supplied to the rear chamber via the second supply passage, to apply the brake function with both the pneumatic pressure and a spring force of the parking spring acting on the top plate.

2. The pneumatic brake of claim 1, further comprising an internal transfer valve disposed in the valve body, the internal transfer valve being movable within the valve body.

3. The pneumatic brake of claim 2, wherein the internal transfer valve has a generally tubular sidewall defining an internal passageway, a nose capping one end of the tubular sidewall, and an opposite open end.

4. The pneumatic brake of claim 3, wherein the internal transfer valve includes a plurality of supply ports in the sidewall adjacent the nose, the supply ports being in fluid communication with the passageway in the valve body.

5. The pneumatic brake of claim 3, wherein the nose of the internal transfer valve is receivable in the valve port in the valve body to close the valve port.

6. The pneumatic brake of claim 3, wherein the sidewall of the internal transfer valve includes a stepped portion, and the valve body includes an internal shoulder that defines a stop for the stepped portion of the internal transfer valve.

7. The pneumatic brake of claim 6, further comprising a valve spring disposed within the internal passageway of the internal transfer valve, the stepped portion of the sidewall defining a spring seat, the valve spring being in urged engagement with the spring seat and the internal shoulder of the valve body.

8. The pneumatic brake of claim 2, wherein sliding movement of the internal transfer valve in the valve body opens and closes the transfer ports.

9. The pneumatic brake of claim 2, wherein the valve body includes a plurality of balance ports in fluid communication with the rear chamber, the sidewall of the internal transfer valve includes a stepped portion, and the internal transfer valve further includes an annular protrusion extending outwardly from the sidewall, the stepped portion and the annular protrusion contacting an inner surface of the valve body, wherein a balance chamber is defined by the stepped portion, the annular protrusion, the sidewall of the internal transfer valve between the stepped portion and the annular protrusion, and the inner surface of the valve body, the balance chamber being in fluid communication with the rear chamber via the balance ports.

10. The pneumatic brake of claim 1, wherein the valve body is continuous with the first supply passage, the first supply passage is coaxially disposed within the second supply passage, and a portion of the second supply passage surrounds the first supply passage.

11. The pneumatic brake of claim 1, wherein the second supply passage is defined in part by a swivel fitting that is fitted within an opening in the rear chamber of the housing.

12. The pneumatic brake of claim 1, wherein the spring force of the parking spring is equivalent to a pneumatic pressure in the range of 50 to 70 psi.

13. The pneumatic brake of claim 1, further including a two-position spool valve in fluid communication with the first supply passage and the second supply passage.

14. The pneumatic brake of claim 13, wherein the spool valve is a 4/2 proportional valve.

15. A brake system including the pneumatic brake of claim 1 connected to an anti-lock braking system (ABS).

16. The brake system of claim 15, wherein the first and second supply passages are connected through the ABS to a source of pneumatic pressure in the range of 110 to 130 psi.

17. The brake system of claim 15, wherein the first and second supply passages are vented to atmosphere through the ABS.

* * * * *